Dec. 21, 1965 W. R. E. HENSEL 3,224,539
DOUBLE ACTING FLUID OPERATED CLUTCH
Filed Nov. 30, 1962
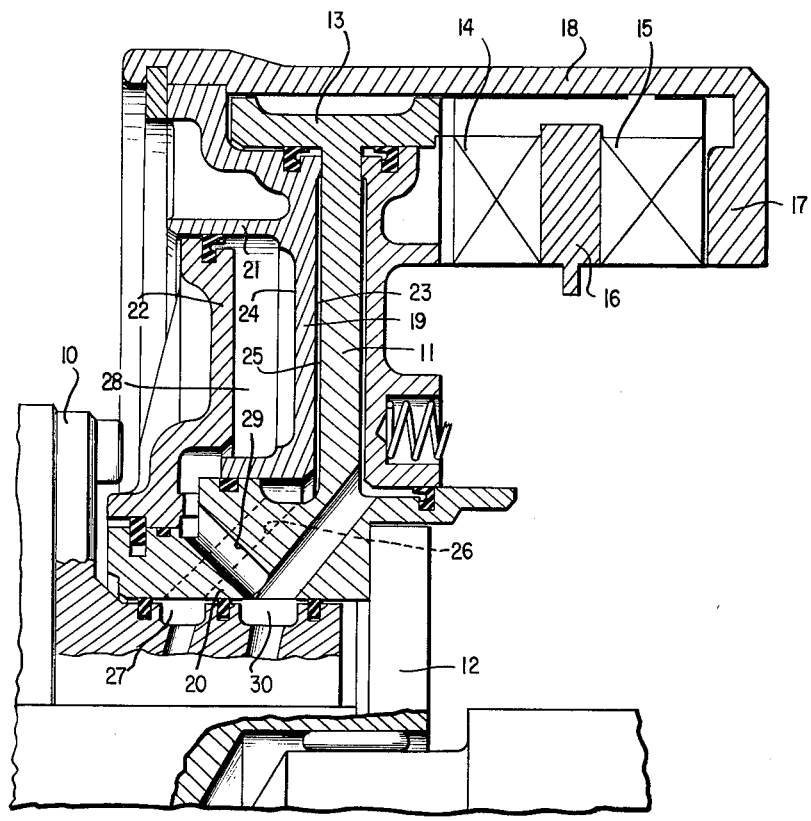
INVENTOR.
WERNER R. E. HENSEL
BY Dicke & Craig
ATTORNEYS

United States Patent Office

3,224,539
Patented Dec. 21, 1965

3,224,539
DOUBLE ACTING FLUID OPERATED CLUTCH
Werner R. E. Hensel, Fellbach, Germany, assignor to Daimler-Benz Aktiengesellschaft, Stuttgart-Unterturkheim, Germany
Filed Nov. 30, 1962, Ser. No. 242,045
Claims priority, application Germany, Dec. 2, 1961,
D 37,585
11 Claims. (Cl. 192—86)

The present invention relates to an actuating installation for a friction clutch, especially for a shifting clutch in automatically shifted change-speed transmissions of motor vehicles, which is arranged together with a second clutch inside of a rotating drum on one side of a disk-like part supporting the drum, whereby the pressure plate of the clutch is operatively connected with an actuating piston disposed on the other side of the disk-like part by means of a longitudinally movable sleeve member disposed outside of the drum.

With a prior art arrangement of this type, the actuating piston engages with a large cup-spring which spring is supported outside at the drum and against which abuts the sleeve. This spring simultaneously serves for the return of the actuating piston and as transmission of the actuating force on the sleeve. The spring has to be constructed very strong in order to overcome the centrifugal force of the oil opposing within the actuating cylinder the return of the piston during disengagement of the clutch. Consequently, the spring of the prior art construction requires a large amount of space. Additionally, a separate return spring has to be provided for the sleeve with the clutch pressure plate.

The present invention aims at the elimination of the aforementioned disadvantages. The present invention solves the underlying problems encountered with the prior art installations of the type described hereinabove by constructing the actuating piston as a double-acting piston having a relatively large piston surface or area effective for the engagement of the clutch and a relatively small piston surface or area whereby the large piston surface or area faces the disk-like part whereas the small piston surface or area is disposed on the opposite side thereof. The actuating piston can thereby be directly connected in such an arrangement with the sleeve member.

In one embodiment according to the present invention, the actuating piston is sealed with respect to the hub portion of the disk-like part and with respect to the drum member extended beyond the disk-like part for purposes of forming the large piston area. For purposes of forming the small piston area, the actuating piston is provided on the side thereof opposite the disk-like part with an annular extension which is sealed with respect to a cover secured on the hub portion of the disk-like part.

By the use of a construction in accordance with the present invention, it is possible to engage and disengage the actuating piston without the interposition of a spring. The cup-spring, difficult to control in practice, as well as the separate return spring for the sleeve member are dispensed with by the arrangement in accordance with the present invention. The present invention additionally offers the further advantageous possibility to load the actuating piston either only on one side thereof or as differential piston. Consequently, it is possible by the arrangement in accordance with the present invention to transmit by means of the thus produced two different actuating forces different moments in two different speeds with one and the same clutch. This means in practice that the matching of the actuating force in the speed with the small moment—which is important for reasons of proper and clean shifting—is realized in a purely constructive manner by the selection of the appropriate diameter which is consideraby more simple than a complicated oil pressure control.

For that purpose, both the annular cylinder accommodating the large piston area as well as the annular cylinder accommodating the small piston area are in communication in an appropriate manner with pressure medium lines. For purposes of engaging the clutch, the actuating piston may be simultaneously loaded with the pressure medium on both of the piston areas thereof by means of an appropriate control. In that case, the piston is operative as differential piston. For purposes of disengaging the clutch, only the large piston area is relieved of the pressure. However, the pressure remains present on the small area of the piston and assures a rapid emptying of the large cylinder space in opposition to the centrifugal force of the oil.

On the other hand, the piston may be selectively loaded in an alternate manner by the pressure medium; namely, for purposes of engaging the clutch, only on the large piston area and for purposes of disengaging the clutch, only on the small piston area. In this case, the piston produces a relatively large actuating force for the clutch with the entire large piston area thereof. Nevertheless, the advantage of the more rapid disengagement remains available.

Accordingly, it is an object of the present invention to provide a clutch actuating mechanism of the type described hereinabove which eliminates the shortcomings and disadvantages encountered with the prior art constructions.

It is another object of the present invention to provide a clutch actuating mechanism especially for a friction clutch which assures a reliable engagement and rapid disengagement by means of a simple, compact and highly effective construction that requires relatively few parts.

Another object of the present invention resides in the provision of an actuating installation for a friction clutch which assures reliable engagement and disengagement of the clutch by the use of parts that may be readily controlled and which obviates the necessity for the use of resilient means either in the connection applying the engaging force or for the disengagement of the clutch.

Still another object of the present invention resides in the provision of an actuating mechanism for friction clutches which requires less space than the known prior art arrangements, and enables a direct connection between the actuating piston and the clutch pressure plate.

A further object of the present invention resides in the provision of an actuating mechanism for a friction clutch which not only offers great versatility in the actuating control, but also enables an improved matching of the actuating force to the torque to be transmitted therethrough by extremely simple means requiring no elaborate control systems.

These and other objects, features and advantages of the present invention will become more obvious from the following description when taken in connection with the accompanying drawing which shows in the single figure thereof, for purposes of illustration only, one embodiment in accordance with the present invention.

Referring now to the single figure of the drawing which shows a partial cross-sectional view through a clutch actuating mechanism for a friction clutch in accordance with the present invention, reference numeral 10 designates therein the housing which is not illustrated in detail and may be of any appropriate construction. A disk-like part 11 is rotatably supported within the housing. The disk-like part 11, in turn, is operatively connected by any suitable means (not illustrated) with a shaft 12 for rotation in unison therewith. The disk-like part 11 radially outwardly thereof passes over into a drum-shaped portion 13. Two friction disk clutches 14 and 15 of any suitable conventional construction and indicated in the drawing only schematically are arranged within this drum-shaped portion 13, which clutches 14 and 15 are supported against a common abutment member 16 disposed therebetween which is secured in the drum-shaped portion 13.

The clutch pressure plate 17 of the right clutch 15 is operatively connected by way of a sleeve member 18 disposed radially outwardly of the drum portion 13 and movable longitudinally thereof with an actuating piston 19 disposed on the other side of the disk-like part 11. The actuating piston 19 is sealed radially outwardly thereof with respect to the drum portion 13 and radially inwardly thereof with respect to the hub portion 20 of the disk-like part 11. The actuating piston 19 is also provided on the side thereof opposite the disk-like part 11 with an annular extension 21 which rests in sealing relationship on a cover member 22 secured in a sealing manner to the hub portion 20.

The drum portion 13 together with the disk-like part 11 and the hub portion 20 thereof forms an annular cylinder 25 which accommodates the large piston area 23 of the actuating piston 19. The smaller piston area 24 faces the counter piston formed by cover member 22. The annular cylinder 25 is in communication by way of an inclined bore 26 with an annular groove 27 for the supply and discharge of the pressure medium. Furthermore, the annular cylinder 28 accommodating the small piston area 24 is in communication with another annular groove 30 of the pressure medium line by way of an inclined bore 29.

The clutch 15 serves in the instant case for coupling transmission parts of a planetary change-speed gear (not illustrated) in two different speeds thereof. Consequently, the clutch 15 has to transmit, in these two speeds, two different torques which can be taken into consideration by differing actuating forces. A showing of a clutch and planetary change speed gearing of the general arrangement contemplated herein is made by the patent to Hensel, 3,053,117.

For a large actuating force in the speed with the higher torque, the large piston area 23 is loaded or acted upon from the annular groove 27 by way of passage 26 and cylinder space 25. As a result thereof, the actuating piston 19 displaces, for purposes of engagement of clutch 15, the sleeve member 18 together with the pressure plate 17 toward the left as viewed in the drawing.

For purposes of disengagement of the clutch 15, the large piston area 23 is relieved of pressure. By reason of the centrifugal force of the pressure medium, the latter would not normally leave sufficiently rapidly the cylinder space 25 and a residual piston force would remain. In order to achieve a completely satisfactory and unobjectionable disengagement of the clutch 15, notwithstanding the effect of the centrifugal force, the pressure is built up from the annular groove 30 by way of passage 29 and cylinder space 28 on the small piston area 24, and the actuating piston 19 is thereby returned into the illustrated position against this residual force.

For purposes of transmitting a smaller torque only a smaller actuating force is necessary. For that purpose, already during the engagement of the clutch 15, both piston areas 23 and 24 at the actuating piston 19 are loaded simultaneously by the pressure medium. The actuating force effective at the pressure plate 17 is then proportional to the difference in the areas at the actuating piston 19. To disengage the clutch 15, only the large piston area 23 is relieved of the pressure in that case whereas the pressure is maintained on the small piston area 24.

While I have shown and described one embodiment in accordance with the present invention, it is understood that the same is not limited thereto, but is susceptible of many changes and modifications within the spirit and scope thereof, and I therefore do not wish to be limited to the details shown and described herein, but intend to cover all such changes and modifications as are encompassed by the scope of the appended claims.

I claim:
1. An actuating mechanism for a friction clutch, especially for a shifting clutch in automatically shifted motor vehicle transmissions, comprising drum means, disk-like means carrying said drum means, clutch means including parts disposed within said drum means and further including a pressure plate disposed on one side of the disk-like means, actuating piston means disposed on the other side of said disk-like means, and connecting means including a longitudinally movable sleeve-like member disposed outwardly of said drum means for operatively connecting said actuating piston means with said pressure plate, said actuating piston means being constructed as double-acting piston having a relatively large piston area effective for the engagement of the clutch means and a relatively small piston area, the large piston area facing said disk-like means and the small piston area being disposed on the side thereof opposite said disk-like means.

2. An actuating mechanism for a friction clutch, especially for a shifting clutch in automatically shifted motor vehicle transmissions, comprising drum means, disk-like means carrying said drum means, clutch means including parts disposed within said drum means and further including a pressure plate disposed on one side of the disk-like means, actuating piston means disposed on the other side of said disk-like means, and connecting means including a longitudinally movable sleeve-like member disposed outwardly of said drum means for operatively connecting said actuating piston means with said pressure plate, said actuating piston means being constructed as double-acting piston having a portion with a relatively large piston area on one side thereof effective for the engagement of the clutch means and a relatively small piston area on the opposite side thereof, the large piston area facing in a direction toward said disk-like means and the small piston area facing in the opposite direction, said disk-like means having a hub portion and said drum means having a part extending beyond said disk-like means in the direction toward said other side, and seal means for sealing said actuating piston means with respect to said hub portion and the extended part of said drum means.

3. An actuating mechanism for a friction clutch, especially for a shifting clutch in automatically shifted motor vehicle transmissions, comprising drum means, disk-like means carrying said drum means, clutch means including parts disposed within said drum means and further including a pressure plate disposed on one side of the disk-like means, actuating piston means disposed on the other side of said disk-like means, and connecting means including a longitudinally movable sleeve-like member disposed outwardly of said drum means for operatively connecting said actuating piston means with said pressure plate, said actuating piston means being constructed as double-acting piston having a portion with a relatively large piston area effective on one side thereof for the engagement of the clutch means and a relatively small piston area, the large piston area facing in a direction toward said disk-like means and the small piston area facing in the opposite direction, said disk-like means having a hub portion and said drum means having a part extending beyond said disk-like means in the direction toward said other side, and seal means for sealing said actuating piston means with respect to said hub portion and the extended part of said drum means, said actuating piston means having an outwardly disposed annular projection for the direct connection thereat with the sleeve member.

4. An actuating mechanism for a friction clutch, especially for a shifting clutch in automatically shifted motor vehicle transmissions, comprising drum means, disk-like means carrying said drum means, clutch means including parts disposed within said drum means and further including a pressure plate disposed on one side of the disk-like means, actuating piston means disposed on the other side of said disk-like means, and connecting means including a longitudinally movable sleeve-like member disposed outwardly of said drum means for operatively connecting said actuating piston means with said pressure plate, said actuating piston means being constructed as double-acting piston having a portion with a relatively large piston area on one side thereof effective for the engagement of the clutch means and a relatively small piston area on the opposite side thereof, the large piston area facing in a direction toward said disk-like means and the small piston area facing in the opposite direction, said disk-like means having a hub portion and said drum means having a part extending beyond said disk-like means in the direction toward said other side, and seal means for sealing said actuating piston means with respect to said hub portion and the extended part of said drum means, said actuating piston means having an outwardly disposed annular projection for the direct connection thereat with the sleeve member, cover means secured in sealing relationship to said hub portion, and an annular extension on said actuating piston means on the side thereof opposite said disk-like means resting against said cover means.

5. In a shifting clutch having a disk-like rotatable part supporting a drum portion, friction clutch means including parts within said drum portion disposed to one side of the disk-like part, said friction clutch means further including a pressure plate adjacent said parts, actuating piston means disposed to the other side of said disk-like part, and connecting means operatively connecting the actuating piston means with the clutch means outwardly of said drum portion, the improvement essentially consisting of matching the actuating force to the torque to be transmitted by the clutch means by constructing the piston as differential piston having a relatively smaller area and a relatively larger piston area, said areas being adapted to be supplied with a pressure medium.

6. An actuating mechanism for a friction clutch, especially for a shifting clutch in automatically shifted motor vehicle transmissions, comprising drum means, disk-like means carrying said drum means, clutch means including parts disposed within said drum means and further including a pressure plate disposed on one side of the disk-like means, actuating piston means disposed on the other side of said disk-like means, and connecting means including a longitudinally movable sleeve-like member disposed outwardly of said drum means for operatively connecting said actuating piston means with said pressure plate, said actuating piston means being constructed as double-acting piston having a portion with a relatively large piston area on one side thereof effective for the engagement of the clutch means and a relatively small piston area on the opposite side thereof, the large piston area facing in a direction toward said disk-like means and the small piston area facing in the opposite direction, said disk-like means having a hub portion and said drum means having a part extending beyond said disk-like means in the direction toward said other side, and seal means for sealing said actuating piston means with respect to said hub portion and the extended part of said drum means, said actuating piston means having an outwardly disposed annular projection for the direct connection thereat with the sleeve member, cover means secured in sealing relationship to said hub portion, and an annular extension on said opposite side of said portion of said piston of said actuating piston means, said annular extension resting against said cover means, said areas being adapted to be supplied with and relieved from a pressure medium.

7. An actuating mechanism for a friction clutch, especially for a shifting clutch in automatically shifted motor vehicle transmissions, comprising drum means, disk-like means carrying said drum means, clutch means including parts disposed within said drum means and further including a pressure plate disposed on one side of the disk-like means, actuating piston means disposed on the other side of said disk-like means, and connecting means including a longitudinally movable sleeve-like member disposed outwardly of said drum means for operatively connecting said actuating piston means with said pressure plate, said actuating piston means being constructed as double-acting piston having a portion with a relatively large piston area on one side thereof effective for the engagement of the clutch means and a relatively small piston area on the opposite side thereof, the large piston area facing in a direction toward said disk-like means and the small piston area facing in the opposite direction, said disk-like means having a hub portion and said drum means having a part extending beyond said disk-like means in the direction toward said other side, and seal means for sealing said actuating piston means with respect to said hub portion and the extended part of said drum means, cover means secured in sealing relationship to said hub portion, and an annular extension on said opposite side of said portion of said piston of said actuating piston means resting against said cover means.

8. In a shifting clutch having a disk-like rotatable part supporting a drum portion, friction clutch means including parts within said drum portion disposed to one side of the disk-like part, said friction clutch means further comprising a pressure plate adjacent said parts, actuating piston means disposed to the other side of said disk-like part, and connecting means operatively connecting the actuating piston means with the clutch means outwardly of said drum portion, the improvement essentially consisting of matching the actuating force to the torque to be transmitted by the clutch means by constructing the piston as differential piston having a relatively smaller and a relatively larger piston area, said larger piston area and said smaller piston area being adapted to be supplied with and relieved from pressure medium.

9. An actuating mechanism for a friction clutch, especially for a shifting clutch in automatically shifted motor vehicle transmissions comprising drum means, disk-like means supporting said drum means, clutch means including parts disposed on one side of the disk-like means within said drum means, said clutch means further including a pressure plate for cooperation with said parts actuating piston means disposed on the other side of said disk-like means, and connecting means including a longitudinally movable sleeve-like member disposed outwardly of said drum means for operatively connecting said actuating piston means with said pressure plate, said actuating piston means being constructed as double-acting piston having a portion with a relatively large piston area on one side thereof effective for the engagement of the clutch means and a relatively small piston area on the opposite side thereof, the large piston area facing in a direction toward said disk-like means and the small piston area facing in the opposite direction, said larger piston area and said smaller piston area being adapted to be supplied with and relieved from pressure medium.

10. An actuating mechanism for a friction clutch, especially for a shifting clutch in automatically shifted motor vehicle transmissions comprising drum means, disk-like means supporting said drum means, clutch means including parts disposed on one side of the disk-like means within said drum means, said clutch means further including a pressure plate for acting upon said parts, actuating piston means disposed on the other side of said disk-like means, and connecting means including a longitudinally movable sleeve-like member disposed outwardly of said drum means for operatively connecting said actuating piston means with said pressure plate, said actuating piston means being constructed as double-acting piston having a portion with a relatively large piston area on one side thereof effective for the engagement of the clutch means and a relatively small piston area on the other side thereof, the large piston area facing in a direction toward said disk-like means and the small piston area in the opposite direction said piston areas being adapted to be alternately loaded by pressure medium applied to only the large piston area for engaging said clutch means and to only the small piston area for disengaging said clutch means.

11. In a shifting clutch having a disk-like rotatable part supporting a drum portion, friction clutch means having pressure parts within said drum portion disposed to one side of the disk-like part, said clutch means further including pressure plate means for cooperation with said parts, actuating piston means disposed to the other side of said disk-like part, and connecting means operatively connecting the actuating piston means with the clutch means, the improvement essentially consisting of said connecting means being a non-resilient mechanical connection directly connecting said actuating piston means with the pressure plate means outwardly of said drum portion, and of matching the actuating force to the torque to be transmitted by the clutch means by constructing the piston as differential piston having a relatively smaller and a relatively larger piston area, said areas being adapted to be supplied with a pressure medium.

References Cited by the Examiner

UNITED STATES PATENTS

| | | |
|---|---|---|
| 2,709,926 | 6/1955 | Jandasek. |
| 2,860,529 | 11/1958 | Sommer. |
| 2,870,655 | 1/1959 | Rockwell. |
| 2,969,131 | 1/1961 | Black et al. _____ 192—86 |

FOREIGN PATENTS

| | | |
|---|---|---|
| 927,421 | 11/1947 | France. |
| 910,162 | 11/1962 | Great Britain. |

DAVID J. WILLIAMOWSKY, *Primary Examiner.*